(12) United States Patent
Army

(10) Patent No.: US 11,814,179 B2
(45) Date of Patent: Nov. 14, 2023

(54) PRESSURE DEVICE HAVING A ONE-WAY VALVE FOR AN AIRCRAFT SENSE LINE

(71) Applicant: Hamilton Sundstrand Corporation, Charlotte, NC (US)

(72) Inventor: Donald E. Army, Enfield, CT (US)

(73) Assignee: HAMILTON SUNDSTRAND CORPORATION, Charlotte, NC (US)

(*) Notice: Subject to any disclaimer, the term of this patent is extended or adjusted under 35 U.S.C. 154(b) by 282 days.

(21) Appl. No.: 17/359,819

(22) Filed: Jun. 28, 2021

(65) Prior Publication Data
US 2022/0411072 A1 Dec. 29, 2022

(51) Int. Cl.
*B64D 13/02* (2006.01)
(52) U.S. Cl.
CPC .................... *B64D 13/02* (2013.01)
(58) Field of Classification Search
CPC .. B64C 2001/009; B64D 13/02; B64D 13/00; B64D 13/04
USPC ............................................. 454/70, 71, 76
See application file for complete search history.

(56) References Cited

U.S. PATENT DOCUMENTS

| 4,506,851 A | 3/1985 | Gupta et al. |
| 5,062,869 A | 11/1991 | Hagen |
| 5,976,364 A * | 11/1999 | Williams ................. B01F 21/22 210/232 |
| 2004/0216792 A1 | 11/2004 | Bunn et al. |
| 2007/0117501 A1* | 5/2007 | Solntsev ................. B64D 13/00 454/76 |
| 2011/0136425 A1 | 6/2011 | Eichholz et al. |
| 2014/0065938 A1 | 3/2014 | Waigl |
| 2016/0159454 A1 | 6/2016 | Fietz et al. |

OTHER PUBLICATIONS

Extended European Search Report for European Application No. 22181638.2; Report dated Oct. 28, 2022 (pp. 1-7).

* cited by examiner

*Primary Examiner* — Ko-Wei Lin
(74) *Attorney, Agent, or Firm* — CANTOR COLBURN LLP

(57) ABSTRACT

An aircraft pressure device includes a connection to ambient having a sensor body mounted to a fuselage of an aircraft. The sensor body includes a sense port. A sense line includes a first end connected to the sense port, a second end defining an opening in the fuselage, and an intermediate portion. A valve is arranged in the intermediate portion, the valve being operable to prevent fluid flow between the first end and the second end.

18 Claims, 5 Drawing Sheets

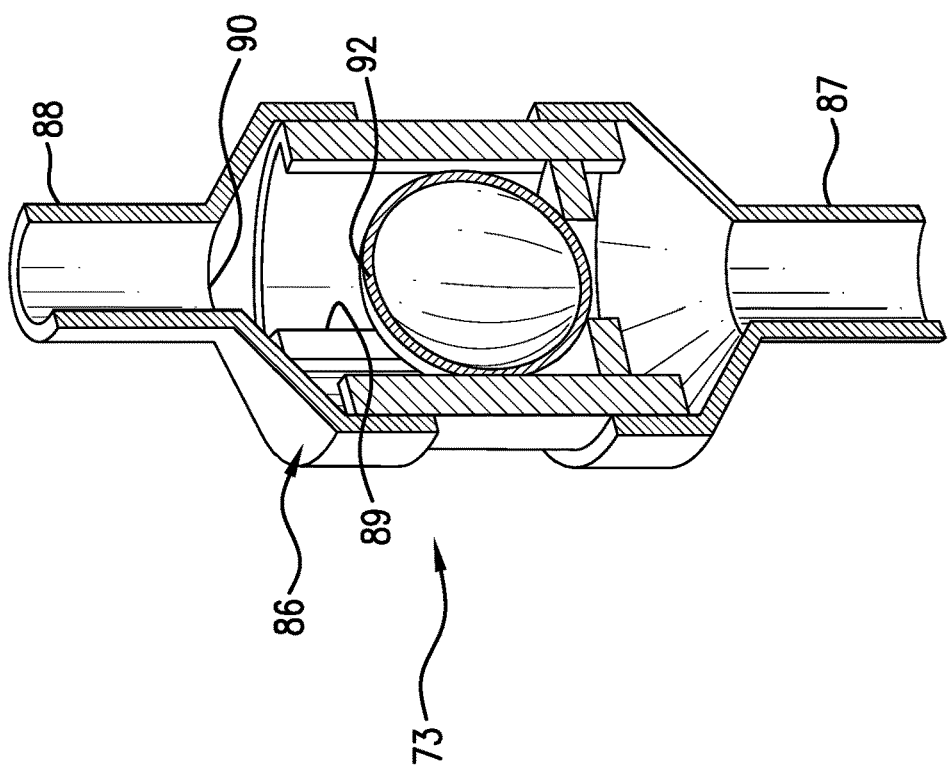
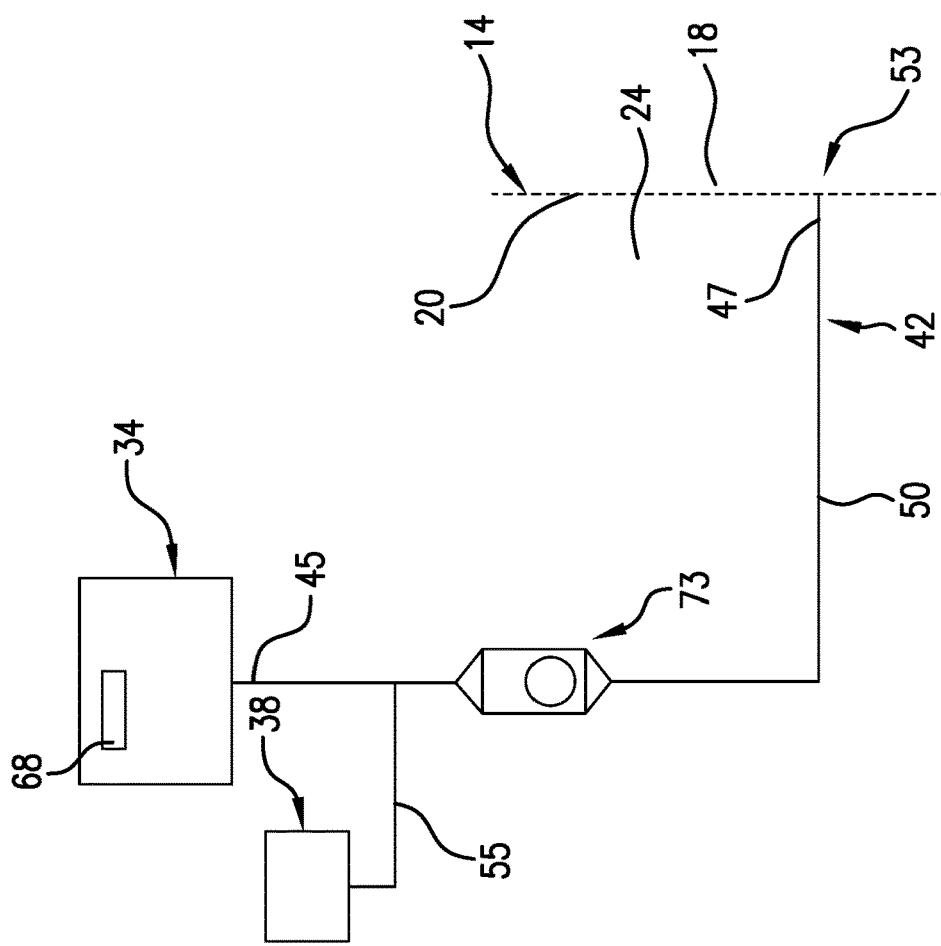

PRESSURE DEVICE HAVING A ONE-WAY VALVE FOR AN AIRCRAFT SENSE LINE

BACKGROUND

Exemplary embodiments pertain to the art of aircraft and, more particularly, to a pressure device having a one-way valve for an aircraft sense line.

Aircraft include various sensors and probes that are employed to detect speed, pressure, temperature, and other factors pertaining to flight conditions both inside and outside of a fuselage. Sensors are also used to control various aircraft systems such as pressure relief valves and the like. While many sensors or probes protrude from the aircraft, others may be flush mounted. That is, the fuselage or wing of the aircraft may include an opening and certain ones of the sensors or probes may include a port that registers with that opening.

Periodically, the fuselage and wing surfaces are washed to remove dirt or other buildup that may detract from an overall operational efficiency of the aircraft. Occasionally, when washing the aircraft, water may migrate into a sensor opening. If the water migrates to a portion of the sensor that does not readily drain to ambient, damage my occur. For example, at altitude, the water may freeze, expand, and cause damage to one or more components of the sensor.

BRIEF DESCRIPTION

Disclosed is an aircraft pressure device including a connection to ambient having a sensor body mounted to a fuselage of an aircraft. The sensor body includes a sense port. A sense line includes a first end connected to the sense port, a second end defining an opening in the fuselage, and an intermediate portion. A valve is arranged in the intermediate portion, the valve being operable to prevent fluid flow between the first end and the second end.

Additionally, or alternatively, in this or other non-limiting examples, the valve includes a first end section connected to the second end and a second end section connected to the first end, the second end section comprising a valve seat.

Additionally, or alternatively, in this or other non-limiting examples, the valve includes a ball configured to selectively rest on the valve seat to prevent liquid flow from the second end passing toward the first end.

Additionally, or alternatively, in this or other non-limiting examples, the ball is neutrally buoyant in a selected liquid.

Additionally, or alternatively, in this or other non-limiting examples, the selected liquid includes an aircraft washing liquid.

Additionally, or alternatively, in this or other non-limiting examples, the aircraft pressure device comprises a positive pressure relief valve.

Additionally, or alternatively, in this or other non-limiting examples, a controller is operable to selectively fluidically connect an aircraft cabin with ambient.

Additionally, or alternatively, in this or other non-limiting examples, the sense line includes a primary sense line and a secondary sense line.

Additionally, or alternatively, in this or other non-limiting examples, the valve includes a first valve arranged in the primary sense line and a second valve arranged in the secondary sense line.

Additionally, or alternatively, in this or other non-limiting examples, the second end defines an ambient sense port.

Also disclosed is an aircraft including a fuselage having an outer surface and an inner surface defining a cabin. A pressure device selectively fluidically connects the cabin with ambient. The pressure device includes a sensor body mounted to the fuselage. The sensor body includes a sense port. A sense line includes a first end connected to the sense port, a second end defining an opening exposed to ambient, and an intermediate portion. A valve is arranged in the intermediate portion. The valve is operable to prevent fluid flow between the first end and the second end.

Additionally, or alternatively, in this or other non-limiting examples, the valve includes a first end section connected to the second end and a second end section connected to the first end, the second end section comprising a valve seat.

Additionally, or alternatively, in this or other non-limiting examples, the valve includes a ball configured to selectively rest on the valve seat to prevent liquid flow from the second end passing toward the first end.

Additionally, or alternatively, in this or other non-limiting examples, the ball is neutrally buoyant in a selected liquid.

Additionally, or alternatively, in this or other non-limiting examples, the selected liquid includes an aircraft washing liquid.

Additionally, or alternatively, in this or other non-limiting examples, the pressure device comprises a positive pressure relief valve.

Additionally, or alternatively, in this or other non-limiting examples, a controller operable to selectively fluidically connect an aircraft cabin with ambient.

Additionally, or alternatively, in this or other non-limiting examples, the sense line includes a primary sense line and a secondary sense line.

Additionally, or alternatively, in this or other non-limiting examples, the valve includes a first valve arranged in the primary sense line and a second valve arranged in the secondary sense line.

Additionally, or alternatively, in this or other non-limiting examples, the second end defines an ambient sense port.

BRIEF DESCRIPTION OF THE DRAWINGS

The following descriptions should not be considered limiting in any way. With reference to the accompanying drawings, like elements are numbered alike:

FIG. 5 is a schematic diagram depicting the pressure device including a one-way valve of FIG. 1, in accordance with a non-limiting example; and FIG. 6 depicts the one-way valve of the pressure device of FIG. 1, in accordance with a non-limiting example.

DETAILED DESCRIPTION

A detailed description of one or more embodiments of the disclosed apparatus and method are presented herein by way of exemplification and not limitation with reference to the Figures.

Figure 1:
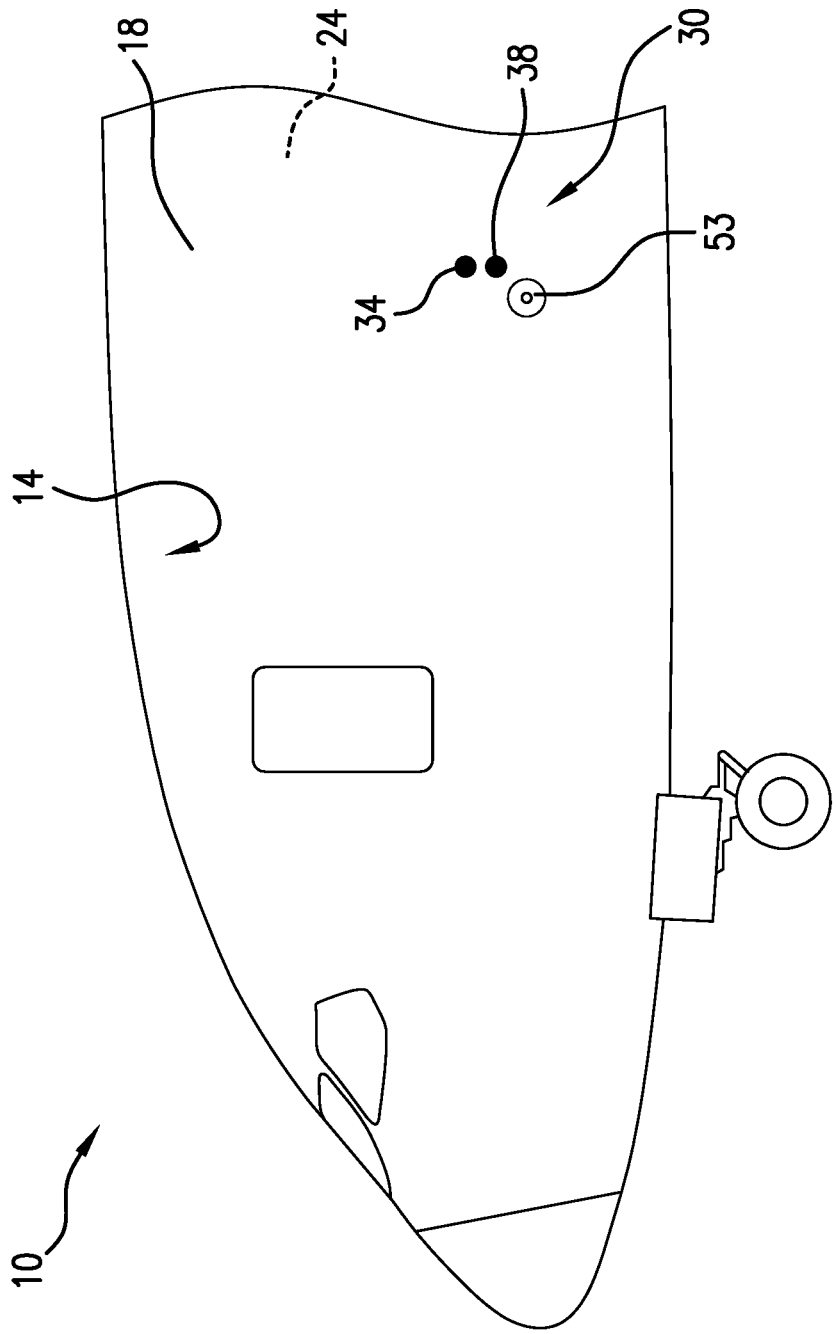
FIG. 1 is a partial plan view of a forward portion of an aircraft including a pressure device including a one-way valve, in accordance with a non-limiting example.
Figure 2:
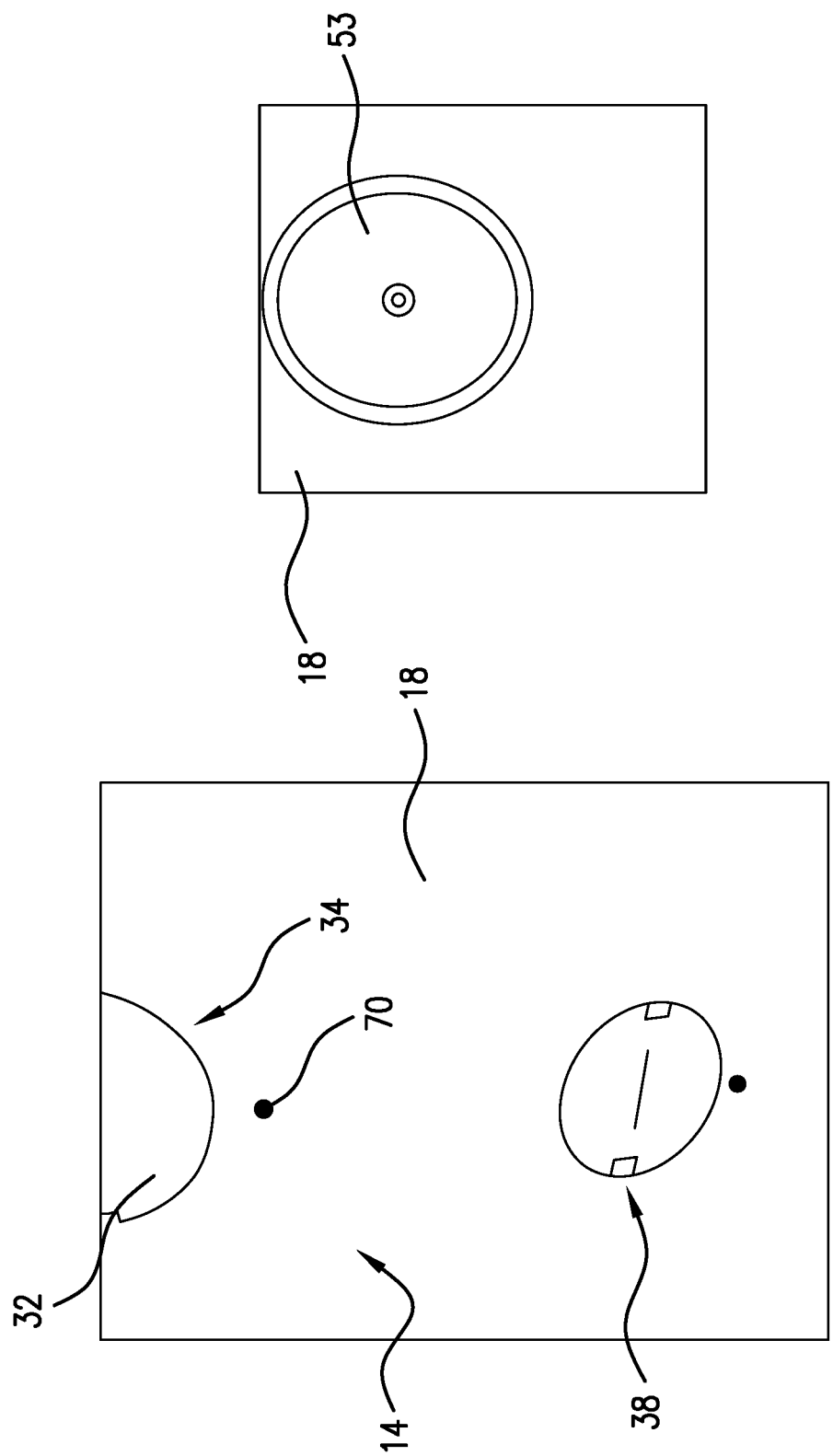
FIG. 2 is a detail view of an outer surface of the aircraft of FIG. 1 showing the pressure device including a one-way valve, in accordance with a non-limiting example.
Figure 3:
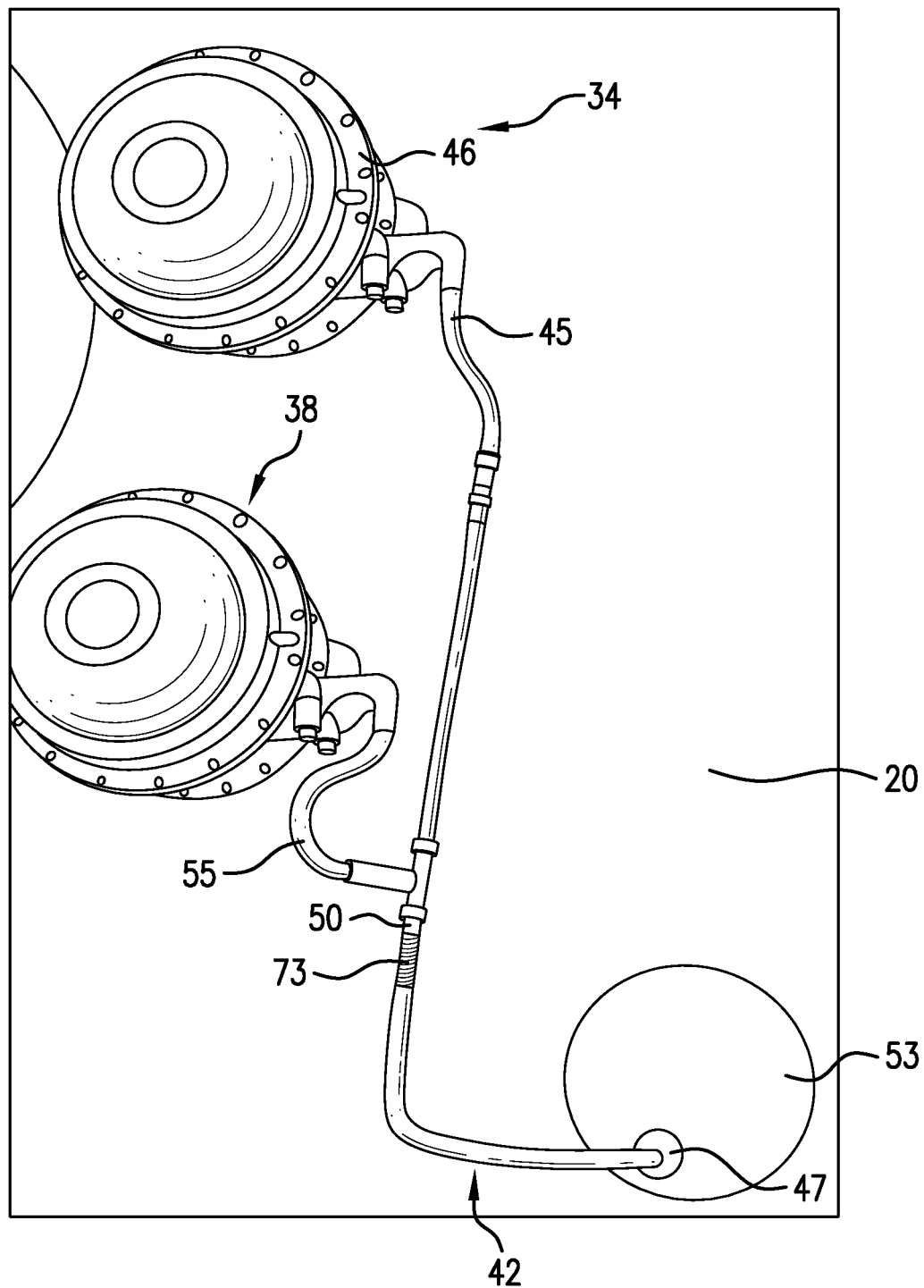
FIG. 3 is a plan view of an inner surface of the aircraft of FIG. 1 showing the pressure device including a one-way valve, in accordance with a non-limiting example.

With initial reference to FIGS. 1 and 2, an aircraft in accordance with a non-limiting example, is indicated generally at 10. Aircraft 10 includes a fuselage 14 having an outer surface 18 and an inner surface 20 (FIG. 3) that defines an aircraft cabin 24 (FIG. 5). A pressure device system 30 is provided in aircraft 10. Pressure device system 30 takes the form of a cabin pressure relief system (not separately labeled) that may vent cabin air to ambient through, for example, a blow door 32 if aircraft cabin pressure exceeds a selected value. Pressure device system 30 includes a first positive pressure relief valve 34 and a second positive pressure relief valve 38. Referring to FIG. 3, and with continued reference to FIG. 2, a primary sense line 42 is connected to first positive pressure relief valve 34 and to second positive pressure relief valve 38.

Primary sense line 42 includes a first end 45 coupled to a sense port (not separately labeled) provided on a sensor body 46 of first positive pressure relief valve 34, a second end 47, and an intermediate portion 50. Second end 47 is exposed to ambient through a remote ambient sense port 53. A branch line 55 extends from intermediate portion 50 to second positive pressure relief valve 38. Each positive pressure relief valve 34, 38 includes an integrated secondary sense line 59 as shown in connection with first positive pressure relief valve 34 in FIG. 4. A similar secondary sense line (not shown) is integrated into second positive pressure relief valve 38. Secondary sense line 59 includes a first end portion 61, a second end portion 63, and an intermediate section 65. First end portion 61 is coupled to a controller 68 on first positive pressure relief valve 34 while second end portion 63 is supported at a flange 69 and is exposed to ambient through outer surface 18 so as to define a secondary sensor port 70.

Figure 4:
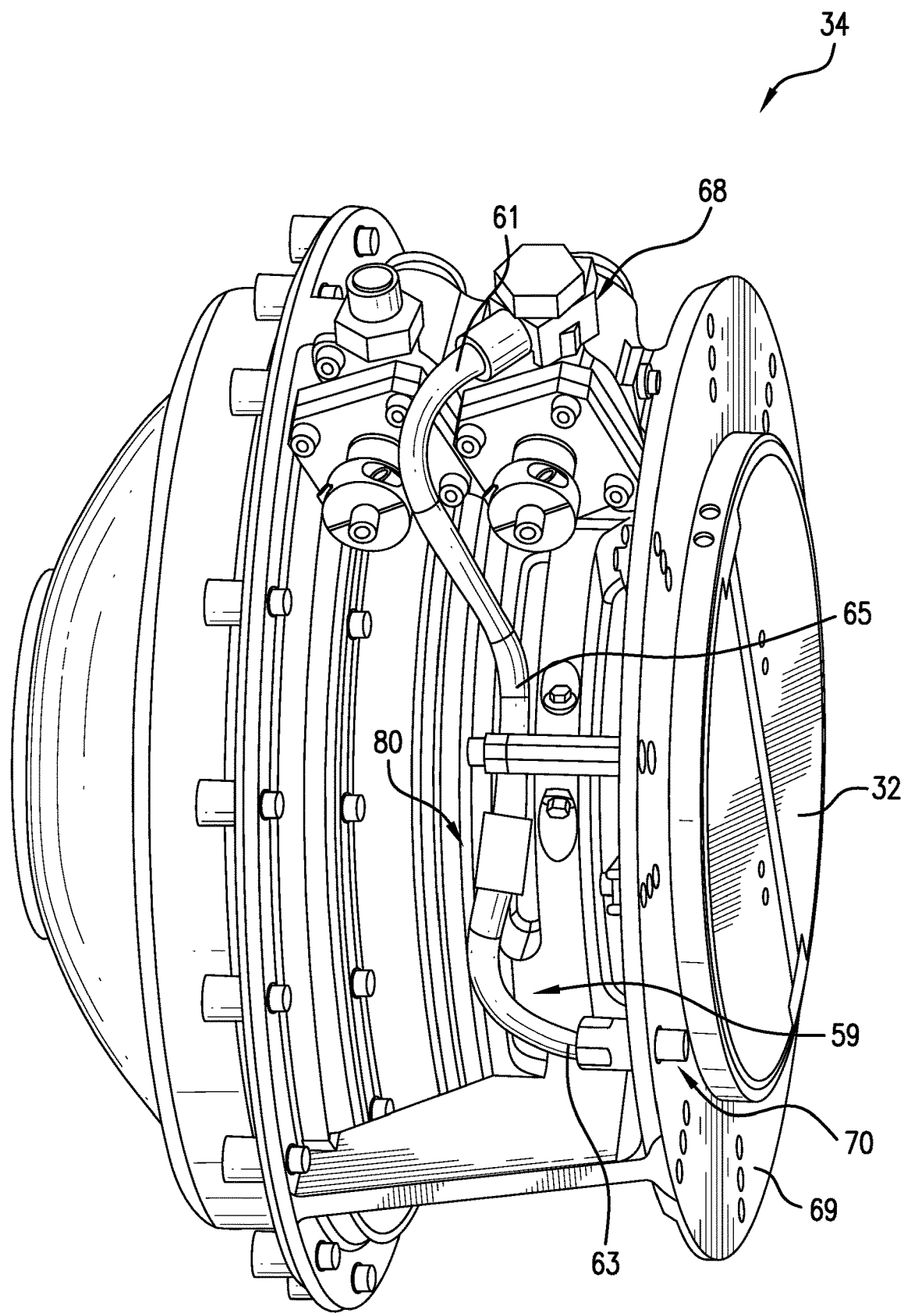
FIG. 4 depicts a perspective view of the pressure device of FIG. 2 including a one-way valve, in accordance with a non-limiting example.

In a non-limiting example illustrated in FIGS. 3 and 5, a first valve 73 is arranged in primary sense line 42 and, as shown in FIG. 4 a second valve 80 is arranged in secondary sense line 59. As will be discussed more fully herein, first valve 73 and second valve 80 prevent fluid sprayed onto fuselage 14 from passing into first positive pressure relief valve 34 and second positive pressure relief valve 38. A discussion will now follow referencing FIG. 6 in describing first valve 73 with an understanding that second valve 80 includes similar structure. First valve 73 is integrated into intermediate portion 50 between branch 55 and inner surface 20 of fuselage 14. In this manner, first valve 73 provides liquid isolation to both first positive pressure relief valve 34 and second positive pressure relief valve 38 in primary sense line 42.

In accordance with a non-limiting example, first valve 73 is a one-way ball valve 86 that includes a first end section 87, a second end section 88, and a chamber 89 disposed therebetween. A valve seat 90 is arranged in chamber 89 at second end section 88 and a ball 92. Ball 92 is neutrally buoyant in a selected liquid such as a washing liquid used to wash aircraft 10. In operation, ambient pressure may readily flow through first valve 73 and be sensed by controller 68. However, during a washing operation any fluid that may pass into primary sense line 42 via remote ambient sense port 53 is blocked when ball 92 is moved against ball seat 90.

Thus, fluid that may enter chamber 89 will urge ball 92 to valve seat 90 creating a blockage. As ball 92 is neutrally buoyant in the washing fluid, the blockage will remain until chamber 89 empties under force of gravity. In this manner, first valve 73 prevents washing fluid from entering into first positive pressure relief valve 34 via remote ambient sense port 53, freezing, expanding, and causing damage. In a similar manner, each positive pressure relief valve 34/38 includes the second valve 80 integrated into corresponding ones of the secondary sense lines such as secondary sense line 59.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An aircraft pressure device including a connection to ambient comprising:
   a positive pressure relief valve including a sensor body mounted to a fuselage of an aircraft, the sensor body including a sense port;
   at least one sense line including a first end connected to the sense port, a second end defining an opening in the fuselage, and an intermediate portion; and
   at least one valve arranged in the intermediate portion, the at least one valve being operable to prevent fluid flow between the first end and the second end.

2. The aircraft pressure device according to claim 1, wherein the at least one valve includes a first end section connected to the second end and a second end section connected to the first end, the second end section comprising a valve seat.

3. The aircraft pressure device according to claim 2, wherein the at least one valve includes a ball configured to selectively rest on the valve seat to prevent liquid flow from the second end passing toward the first end.

4. The aircraft pressure device according to claim 3, wherein the ball is neutrally buoyant in a selected liquid.

5. The aircraft pressure device according to claim 4, wherein the selected liquid includes an aircraft washing liquid.

6. The aircraft pressure device according to claim 1, further comprising: a controller operable to selectively fluidically connect an aircraft cabin with ambient.

7. The aircraft pressure device according to claim 1, wherein the at least one sense line includes a primary sense line and a secondary sense line.

8. The aircraft pressure device according to claim 7, wherein the at least one valve includes a first valve arranged in the primary sense line and a second valve arranged in the secondary sense line.

9. The aircraft pressure device according to claim 1, wherein the second end defines an ambient sense port.

10. An aircraft comprising:
a fuselage having an outer surface and an inner surface defining a cabin;
a pressure device selectively fluidically connecting the cabin with ambient, the pressure device comprising:
a positive pressure relief valve including a sensor body mounted to the fuselage, the sensor body including a sense port;
at least one sense line including a first end connected to the sense port, a second end defining an opening exposed to ambient, and an intermediate portion; and
at least one valve arranged in the intermediate portion, the at least one valve being operable to prevent fluid flow between the first end and the second end.

11. The aircraft according to claim 10, wherein the at least one valve includes a first end section connected to the second end and a second end section connected to the first end, the second end section comprising a valve seat.

12. The aircraft according to claim 11, wherein the at least one valve includes a ball configured to selectively rest on the valve seat to prevent liquid flow from the second end passing toward the first end.

13. The aircraft according to claim 12, wherein the ball is neutrally buoyant in a selected liquid.

14. The aircraft according to claim 13, wherein the selected liquid includes an aircraft washing liquid.

15. The aircraft according to claim 10, further comprising: a controller operable to selectively fluidically connect an aircraft cabin with ambient.

16. The aircraft according to claim 10, wherein the at least one sense line includes a primary sense line and a secondary sense line.

17. The aircraft according to claim 16, wherein the at least one valve includes a first valve arranged in the primary sense line and a second valve arranged in the secondary sense line.

18. The aircraft according to claim 10, wherein the second end defines an ambient sense port.

* * * * *